United States Patent
Yu et al.

(10) Patent No.: US 11,082,688 B2
(45) Date of Patent: Aug. 3, 2021

(54) RESTRICTED OVERLAPPED BLOCK MOTION COMPENSATION

(71) Applicant: Telefonaktiebolaget LM Ericsson (publ), Stockholm (SE)

(72) Inventors: Ruoyang Yu, Täby (SE); Kenneth Andersson, Gävle (SE); Per Wennersten, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/961,947

(22) PCT Filed: Dec. 14, 2018

(86) PCT No.: PCT/EP2018/085009
§ 371 (c)(1),
(2) Date: Jul. 14, 2020

(87) PCT Pub. No.: WO2019/137735
PCT Pub. Date: Jul. 18, 2019

(65) Prior Publication Data
US 2020/0351494 A1 Nov. 5, 2020

Related U.S. Application Data

(60) Provisional application No. 62/617,398, filed on Jan. 15, 2018.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11); *H04N 19/46* (2014.11); *H04N 19/583* (2014.11)

(58) Field of Classification Search
CPC .. H04N 19/105; H04N 19/132; H04N 19/176; H04N 19/46; H04N 19/583; H04N 19/513
See application file for complete search history.

(56) References Cited

U.S. PATENT DOCUMENTS 8,848,783 B2 * 9/2014 Kim ................. H04N 19/583
375/240.02
9,503,720 B2 11/2016 Chen et al.
(Continued)

OTHER PUBLICATIONS

International Search Report and Written Opinion of the International Searching Authority, PCT/EP20148/085009, dated May 20, 2019, 21 pages.
(Continued)

*Primary Examiner* — Boubacar Abdou Tchoussou
(74) *Attorney, Agent, or Firm* — Sage Patent Group

(57) ABSTRACT

A method of encoding/decoding a picture of a video signal includes selecting a block of the picture for decoding, comparing a motion vector associated with the selected block to a motion vector associated with a neighbouring block that is adjacent the block, and determining whether to use motion vectors associated with the neighbouring block in encoding/decoding of the block based on the comparison of the motion vector associated with the selected block and the motion vector associated with the neighbouring block.

15 Claims, 18 Drawing Sheets

(51) Int. Cl.
*H04N 19/176* (2014.01)
*H04N 19/46* (2014.01)
*H04N 19/583* (2014.01)

(56) References Cited

U.S. PATENT DOCUMENTS

| | | | |
|---|---|---|---|
| 9,883,203 B2* | 1/2018 | Chien | H04N 19/139 |
| 10,230,980 B2* | 3/2019 | Liu | H04N 19/583 |
| 10,798,404 B2* | 10/2020 | Chuang | H04N 19/139 |
| 2020/0288168 A1* | 9/2020 | Zhang | H04N 19/583 |

OTHER PUBLICATIONS

Larouche, Guillaume et al. "RD Optimized Coding for Motion Vector Predictor Selection," IEEE Transactions on Circuits and Systems for Video Technology, vol. 18, No. 9, Sep. 2008, pp. 1247-1257.

Lin, Jian Liang et al. "Improved Advanced Motion Vector Prediction," Document No. JCTVCV-D125, Joint Collaboration on Video Coding (JCT-VC) of ITU-T SG16 WP3 and ISO/IEC JTC1/SC29/WG11, 4$^{th}$ Meeting. Daegu, Korea, Jan. 20-28, 2011, 8 pages.

Chen, Jianle et al., "Algorithm Description of Joint Exploration Test Model 7 (JEM 7)," Document No. JVET-G1001-v1, Joint Video Exploration Team (JVET) of ITU-T SG 16 WP 3 and ISO/IEC JTC 1/SC 29/WG 11, 7$^{th}$ Meeting, Torino, Italy, Jul. 13-21, 2017, 48 pages.

Hu, Nan et al., "Unification of parameter derivation for CCLM and LIC," Document No. JVET-D0122-v2, Joint Video Exploration Team (JVET) of ITU-T SG 16 WP 3 and ISO/IEC JTC 1/SC 29/WG 11, Chenghu, China, Oct. 15-21, 2016, 6 pages.

Sjöberg, Rickard et al., "Description of SDR and HDR video coding technology proposal by Ericsson and Nokia," Document No. JVET-J0012-v1, Joint Video Exploration Team (JVET) of ITU-T SG 16 WP 3 AND ISO/IEC JTC 1/SC 29/WG 11, San Diego, California, USA, Apr. 10-20, 2018, 32 pages.

* cited by examiner

An example of motion vector MV = (3,1). The current prediction block is C and its best matching block in the reference picture is D LIC example showing current block C and its interaction between B and A.

A 16x16 block in non-sub-block mode. Its sub-blocks at left and above boundaries are candidates where OBMC is applied.

RESTRICTED OVERLAPPED BLOCK MOTION COMPENSATION

CROSS REFERENCE TO RELATED APPLICATIONS

This application is a 35 U.S.C. § 371 national stage application of PCT International Application No. PCT/EP2018/085009 filed on Dec. 14, 2018, which in turn claims domestic priority to U.S. Provisional Patent Application No. 62/617,398 filed on Jan. 15, 2018, the disclosures and content of which are incorporated by reference herein in their entirety.

BACKGROUND

Embodiments of the inventive concepts relate to video encoding/decoding systems, methods and apparatus, and in particular to systems, methods and apparatus that perform video encoding/decoding using motion vectors.

A video sequence consists of a series of pictures. Each picture is identified with a picture order count (POC) value. The difference between two POC values can be used as a measurement of the temporal distance between two pictures in the order in which they are displayed to a viewer. Each picture in a video sequence consists of one or more components. In particular, each picture typically includes three components, namely, one luma component and two chroma components. The components are additively combined to generate a picture that is displayed to a viewer. Each component may include a two-dimensional rectangular array of sample values.

Video coding standards, such as H.264 and H.265 (High Efficiency Video Coding, or HEVC), utilize block-based prediction. That is, each component of the picture is divided into blocks that are used as a basis for predicting the sample values of the component. A block is one two-dimensional array of samples.

Inter Prediction and Motion Vector Hypothesis

There are two types of prediction used for encoding/decoding pictures for display: intra prediction and inter prediction. Inter prediction predicts blocks of a current picture using blocks obtained from previously decoded pictures. The previously decoded pictures that are used for prediction are referred to as reference pictures. The location of a referenced block inside the reference picture relative to the location of the block in a current picture is indicated using a motion vector (MV). FIG. 1 shows an example of a motion vector. The motion vector indicates the displacement from the current picture of the position of a block C in the current picture relative to the position of the referenced block D in the reference picture.

MVs can point to fractional sample positions for more precisely capturing the displacement. Fractional samples are generated from the nearby integer samples using interpolation. In HEVC Model (HM) video coding implementations, an MV can point to a ¼th sample, while in Joint Exploration Model (JEM) video coding implementations, an MV can point to a 1/16th sample.

When encoding an inter block, the encoder searches for a block from the reference pictures that best matches the block to be encoded. When a best match is found, the encoder calculates an MV based on the relative positions of the block to be encoded in the current picture and the block from the reference picture. The resulting MV is a hypothesis of motion of the block moving between the current picture and the reference picture.

To reduce the overhead of signaling motion vectors, two MV prediction tools are typically used, namely, Merge and Advanced MV Prediction (AMVP). Both tools utilize the fact that MVs inside a picture can be viewed as a stochastic process and there exist correlations among the MVs in a picture (i.e., blocks in a picture tend to have similar motion vectors relative to reference pictures). When a current block is in merge mode, then one of its neighbouring block's MV is fully reused. When the current block is in AMVP mode, then one of its neighbouring blocks' MV is treated as a predictor and the resulting MV difference is explicitly signaled. The decoder follows the same MV prediction procedure to reconstruct the MV. After the MV gets reconstructed, motion compensation process is invoked for deriving the prediction block.

Residual Block Transform and Quantization

A block containing the difference between samples of a source block and samples of the prediction block, referred to as a residual block, is then typically compressed by a spatial transform to remove further redundancy. The transform coefficients are then quantized by a quantization parameter (QP) to control the fidelity of the residual block and thus also the bitrate required to compress the block. A coded block flag (CBF) is used to indicate if there are any non-zero quantized transform coefficients. All coding parameters are then entropy coded at the encoder and decoded at the decoder. A reconstructed residual block can then be derived by inverse quantization and inverse transformation of the quantized transform coefficients if the coded block flag is set. The reconstructed residual block is then added to the prediction block.

Deblocking

After blocks have been reconstructed, deblocking is applied to reduce boundaries between coded blocks. In HEVC and JEM, deblocking is first applied on vertical boundaries of the block and then on horizontal boundaries of the block. A deblocking filter strength parameter, boundary strength (bs), is set for each boundary. If the value of bs is larger than 0, then deblocking may be applied. The larger the boundary strength is, the stronger filtering is applied.

To perform deblocking, first a check is made to see if any of the blocks at a boundary between the blocks is an intra coded block, in which case bs is set to 2 (bs=2). If both blocks use inter prediction but they use different reference pictures or have significantly different motion vectors, or if a residual block is coded, then bs is set to 1 (bs=1). The first check sets a boundary strength (bs) larger than 0 to indicate that deblocking should be applied. The larger the boundary strength is the stronger filtering is applied. To avoid removing natural structures when deblocking, a check that there are not any natural structures on respective sides of the boundary is then applied for the luma component. In HEVC, gradient calculations are used on respective sides of the boundary using the following inequality: $|p0-2*p1+p2|+|q0-2*q1+q2|<beta$, where beta is a parameter based on the quantization parameter for the block, p0, p1, p2 are samples on one side of the block boundary, and q0, q1, q2 are samples on the other side of the block boundary. The condition is checked at multiple positions along the boundary, and if all conditions checks are fulfilled, then the luma samples are deblocked. Chroma boundaries are always filtered if one any of the neighbouring blocks are intra coded.

Local Illumination Compensation (LIC)

LIC is applied on the prediction block after motion compensation. LIC is a linear model-based tool that is used for handling local illumination change within a certain area.

As shown in FIG. 2, the current block is C and the prediction block referenced from its motion vector is D. The area marked B represents the top and left neighbouring reconstructed samples of the current block C. The area marked A represents the top and left neighbouring area of the reference block D in the reference picture. LIC derives a weight (W) value and an offset (O) value by minimizing the quantity |(W*A+O)−B|. After values of W and O are derived, those parameters are then applied to the prediction block D. Thus, the modified prediction block is W*D+O.

In JEM, there is a block level LIC flag that signals the usage of the LIC tool. When the LIC flag is on, then the LIC operation is applied for each component separately.

Overlapped Block Motion Compensation (OBMC)

Generally, for an inter block, only one set of MV hypotheses is used for generating a prediction block. OBMC applies multiple sets of MV hypotheses to an inter block to generate a final prediction block. OBMC operates on a sub-block (4×4) basis. The sub-blocks that are at the block boundaries are candidate sub-blocks where OBMC can be applied, as shown in FIG. 3. As shown in FIG. 3, a block includes a 4×4 array of 16 sub-blocks. The sub-blocks adjacent to the left and upper boundaries are candidates for applying OBMC because they are previously encoded/decoded blocks for which motion vectors have already been obtained. The sub-blocks on the right and lower boundaries are not candidates for OBMC because they abut blocks that have not yet been encoded/decoded.

When OBMC applies to a sub-block, in addition to a current MV, MVs of its connected neighbouring sub-blocks are also used to derive a prediction block for the current sub-block if they are available and contain motion vectors that are not identical to that of the current MV. These multiple prediction blocks based on multiple MVs are combined to generate the final prediction signal of the current sub-block.

FIG. 4 schematically depicts a simple example of OBMC. Assuming that a current sub-block has MV (C) and its top and left neighbors are available, the top neighbor has MV (Up) and the left neighbor has MV (Left). The final prediction block is a weighted average of the prediction blocks generated from these MVs. Usually, the prediction block that is generated from the current MV is assigned a higher weight.

In JEM, there is a flag at the block level for switching OBMC on and off. When a block is encoded in merge or skip mode, the OBMC flag is implicitly inferred to be 1. When the block is not encoded with merge but its size (width*height) is larger than a predetermined threshold, then the OBMC flag is also implicitly inferred to be 1. Otherwise, the OBMC flag is explicitly signaled.

It should be noted that there are sub-block modes in JEM in which a block can be divided into sub-blocks, and MVs of the sub-blocks can be different, such as, for example, in the pattern matched motion vector derivation (PMMVD, sometimes called FRUC), affine motion compensation and the alternative temporal motion vector prediction (ATMVP) and spatial-temporal motion vector predictor (STMVP). For those cases, the sub-blocks inside the block are also candidate sub-blocks where OBMC is applied. For those sub-blocks, up to 4 MV hypothesis (from above, left, right and bottom) can be applied.

Hierarchical Picture Coding Structure

In random access configuration, intra coded pictures are positioned at fixed intervals, such as every second. Pictures between intra coded pictures are typically coded with a B-GOP structure as shown in FIG. 5. In a B-GOP structure, B-frames are encoded with reference to pictures having both larger and smaller POCs relative to the encoded picture. In the example illustrated in FIG. 5, Picture 0 is coded first and then picture 8 is coded using picture 0 as its reference picture. Then picture 8 and picture 0 are used as reference pictures to code picture 4. Then similarly, picture 2 and picture 6 are coded. And finally, picture 1, 3, 5 and 7 pictures are coded.

Pictures 1, 3, 5 and 7 are described as being on the highest hierarchical level, pictures 2, 4 and 6 are on the next highest hierarchical level, picture 4 is on the next lowest level and pictures 0 and 8 are on the lowest level. Typically pictures 1, 3, 5 and 7 are not used for reference of any other pictures. Such pictures are called non-reference pictures.

The quantization parameter (QP) assigned for each picture is usually different and is set according to the hierarchy level. A higher QP is typically assigned for pictures that are at a higher hierarchy level.

SUMMARY

A method of decoding a picture of a video signal according to some embodiments includes selecting a block of the picture for decoding, comparing a motion vector associated with the selected block to a motion vector associated with a neighbouring block that is adjacent the block, and determining whether to use motion vectors associated with the neighbouring block in decoding of the block based on the comparison of the motion vector associated with the selected block and the motion vector associated with the neighbouring block.

A decoder according to some embodiments includes a processor circuit, an I/O unit coupled to the processor circuit, and a memory coupled to the processor circuit. The memory includes non-transitory computer readable program code that configures the processor circuit to perform operations including selecting a block of the picture for decoding, comparing a motion vector associated with the selected block to a motion vector associated with a neighbouring block that is adjacent the block, and determining whether to use motion vectors associated with the neighbouring block in decoding of the block based on the comparison of the motion vector associated with the selected block and the motion vector associated with the neighbouring block.

A method of encoding a picture of a video signal according to some embodiments includes selecting a block of the picture for encoding, comparing a motion vector associated with the selected block to a motion vector associated with a neighbouring block that is adjacent the block, and determining whether to use motion vectors associated with the neighbouring block in the encoding of the block based on the comparison of the motion vector associated with the selected block and the motion vector associated with the neighbouring block.

An encoder according to some embodiments includes a processor circuit, an I/O unit coupled to the processor circuit, and a memory coupled to the processor circuit. The memory includes non-transitory computer readable program code that configures the processor circuit to perform operations including selecting a block of the picture for encoding, comparing a motion vector associated with the selected block to a motion vector associated with a neighbouring block that is adjacent the block, and determining whether to use motion vectors associated with the neighbouring block in encoding of the block based on the comparison of the motion vector associated with the selected block and the motion vector associated with the neighbouring block.

A method of decoding a picture of a video signal according to further embodiments includes selecting a block of the picture for decoding, obtaining an overlapped block motion compensation, OBMC, restriction criterion, determining whether the OBMC restriction criterion is met with respect to the block, and in response to determining that the OBMC restriction criterion is met, decoding the block without performing full OBMC decoding on the block.

A decoder according to further embodiments includes a processor circuit, an I/O unit coupled to the processor circuit, and a memory coupled to the processor circuit. The memory includes non-transitory computer readable program code that configures the processor circuit to perform operations including selecting a block of a picture of a video signal for decoding, obtaining an overlapped block motion compensation, OBMC, restriction criterion, determining whether the OBMC restriction criterion is met with respect to the block, and in response to determining that the OBMC restriction criterion is met, decoding the block without performing full OBMC decoding on the block.

A method of encoding a picture of a video signal according to further embodiments includes selecting a block of the picture for encoding, obtaining an overlapped block motion compensation, OBMC, restriction criterion, determining whether the OBMC restriction criterion is met with respect to the block, and in response to determining that the OBMC restriction criterion is met, encoding the block without performing full OBMC encoding on the block.

An encoder according to further embodiments includes a processor circuit, an I/O unit coupled to the processor circuit, and a memory coupled to the processor circuit. The memory includes non-transitory computer readable program code that configures the processor circuit to perform operations including selecting a block of a picture of a video signal for encoding, obtaining an overlapped block motion compensation, OBMC, restriction criterion, determining whether the OBMC restriction criterion is met with respect to the block, and in response to determining that the OBMC restriction criterion is met, encoding the block without performing full OBMC encoding on the block.

Some embodiments may reduce complexity of encoding/decoding a video signal and/or processing resources needed for encoding/decoding a video signal by selectively performing or not performing, block motion compensation based on analysis of motion vectors in selected block and a neighboring block.

DESCRIPTION OF EMBODIMENTS

There currently exist certain challenges in the approaches described above. For example, the OBMC scheme in JEM introduces high complexity to both the encoding and decoding processes. Accordingly, OBMC may require significant processing and memory resources to implement.

Certain aspects of the inventive concepts may provide solutions to the challenges described above. Some embodiments of the inventive concepts restrict the use of motion vectors associated with neighbouring blocks in encoding/decoding of a selected block based on analysis of motion vectors of the neighboring block and the selected block.

More particularly, some embodiments of the inventive concepts restrict the application of OBMC to situations in which the encoding/decoding process may more efficiently benefit from the use of OBMC. By restricting the application of OBMC to defined situations, the processing time and/or amount of processing resources needed for encoding/decoding using OBMC may be reduced.

In particular embodiments, a processing apparatus, which may be an encoder or decoder, determines whether an OBMC restriction criterion has been met for a particular block that is being encoded/decoded, and, if the OBMC restriction criterion is met, OBMC is not performed for the block, or OBMC is performed in a simplified manner, such as by only applying OBMC for a reduced number of neighbouring MV hypotheses.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

OBMC Restriction

Figure 7:
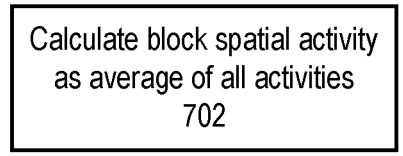

In some embodiments, a processing apparatus, which may be an encoder or decoder, determines whether an OBMC restriction criterion has been met for a particular block that is being encoded/decoded, and, if the OBMC restriction criterion is met, OBMC is not performed for the block, or OBMC is performed in a simplified manner. Operations of systems/methods according to some embodiments are illustrated in FIG. 7. As shown therein, in some embodiments, a processing device selects a block for encoding/decoding from a plurality of blocks in a picture (block 602). The selected block comprises an inter block that is to be encoded/decoded by reference to another picture.

The systems/methods then obtain an OBMC restriction criterion (block 604). The OBMC restriction criterion may be predefined or received, for example, in an encoded video signal. The systems/methods then determine if the selected block meets the obtained OBMC restriction criterion (block 606). If not, operations proceed to block 608, and the block is encoded/decoded using full OBMC. However, if the OBMC restriction criterion is met, operations proceed to block 610, and the block is encoded/decoded without performing full OBMC. In some embodiments, OBMC may be skipped entirely. In other embodiments, only a limited OBMC may be performed or OBMC may be performed in a simplified or limited manner. For example, in some embodiments, rather than skipping OMBC completely for a sub-block, OMBC may be applied for a reduced number of neighbouring MV hypotheses that also meet the OBMC restriction criterion.

In some embodiments, the selected block may comprise a single sub-block. However, in other embodiments, the selected block may comprise one or more sub-blocks on which OBMC may be performed.

Some embodiments are based on an appreciation that it may be useful to identify cases when OBMC is less beneficial, either because the MV hypothesis from neighbouring blocks is not accurate for the current block, or because the neighbouring MV hypothesis is too close to the current MV hypothesis.

In some embodiments, the OBMC restriction criterion may include a metric that characterizes the spatial activity of the corresponding prediction block. In this context, spatial activity refers to how much the samples in the block vary from sample to sample. Accordingly, in these embodiments, the OBMC restriction criterion is based on the spatial activity of the corresponding prediction block. When the spatial activity of the prediction block is lower than a predetermined threshold, then OBMC is limited or skipped for that block.

In some embodiments, the spatial activity may be measured as follows. For a sample $P_{i,j}$ inside a block at position (i, j), the spatial activity can be measured by taking the sample value difference between the current and the neighbouring samples. For example, spatial activity can be estimated as:

$$\Delta P_{i,j} = |4*P_{i,j} - P_{i-1,j} - P_{i+1,j} - P_{i,j-1} - P_{i,j+1}| \qquad [1]$$

Referring to FIG. 7, for a block with size M×N, the block spatial activity can be calculated (block 702) as the averaged sum of all the activities from its samples. For example, an average block spatial activity La for an M×N block can be estimated as:

$$La = (\Sigma_{i \in M, j \in N} \Delta P_{i,j})/M \times N \qquad [2]$$

In some embodiments, to avoid performing a division operation when determining the average spatial activity La, the division may be replaced by multiplication and a bitwise right shift, or alternatively by only a bitwise right shift. This may increase the speed of the calculation with acceptable impact on accuracy.

Figure 8:
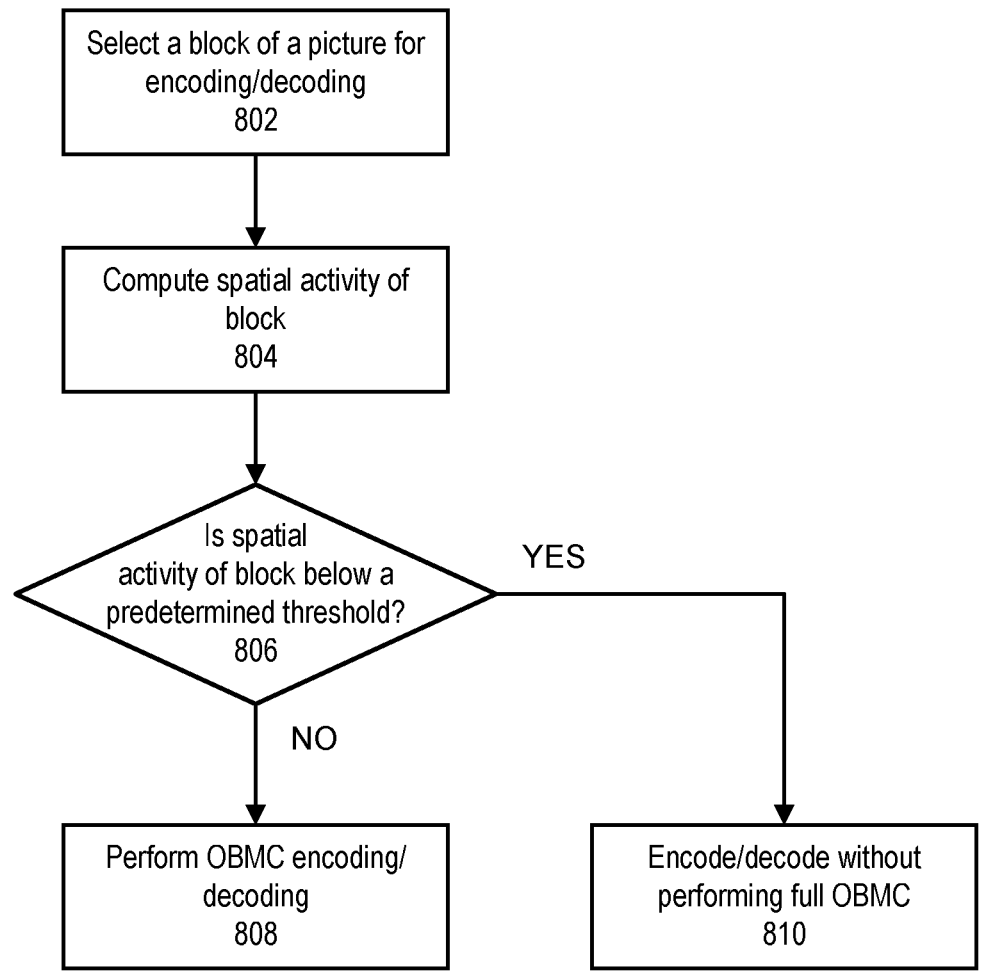

Referring to FIG. 8, a block of a picture is selected for encoding/decoding (block 802). The operations then calculate the spatial activity of the block, such as by calculating the average spatial activity La according to Equation [2] (block 804).

The spatial activity metric La is then compared to a predetermined threshold (block 806). If the spatial activity La is above the threshold, then full OBMC may be performed (block 808). However, if the spatial activity La is lower than the threshold, then OBMC may be skipped or limited (block 810).

In some embodiments, the threshold may be set to k<<(bit_depth−8), that is, the binary value of k left shifted by a bit position value equal to the bit depth minus 8. In some embodiments, k=4. The bit depth refers to the number of bits used to represent each sample value. In some embodiments, the calculation may be accelerated by determining specific thresholds for different block sizes and using a table lookup to obtain a specific threshold for a block.

In some embodiments, an alternative spatial metric measures the sample value difference separately in the vertical and horizontal directions. For example, in some embodiments, the spatial activity of a sample can be estimated as:

$$\Delta P_{i,j} = |2*P_{i,j} - P_{i-1,j} - P_{i+1,j}| + |2*P_{i,j} - P_{i,j-1} - P_{i,j+1}| \qquad [3]$$

For a block with size M×N, the block spatial activity can be measured as the averaged sum of all the activities from its samples as provided in Equation [2] above.

In some embodiments, a threshold may be determined for each block based on an initial threshold and the number of samples of the block. The criterion can then compare the sum of spatial activities for the block with the determined threshold. For example, the comparison of the spatial activity with the threshold may be written as:

$$La < M*N*(4<<bit\_depth-8)) \qquad [4]$$

If the 5-tap activity metric shown in Equation [1] above is only used inside the block, the number of activities will be (M−2)*(N−2), and thus the criterion will be:

$$La < (M-2)*(N-2)*(4<<bit\_depth-8)) \qquad [5]$$

In some embodiments, the average spatial activity metric may be computed only on the sub-blocks of the prediction block that are affected by OBMC. That is, a determination may be made at the block level as to whether OBMC will be performed on the block. Then, for blocks that are affected by OBMC, decisions may be made whether to apply OBMC to each individual sub-block. In some embodiments, a determination of whether to apply OBMC may be made on a block-by-block basis or on a sub-block-by-sub-block basis.

Figure 9:
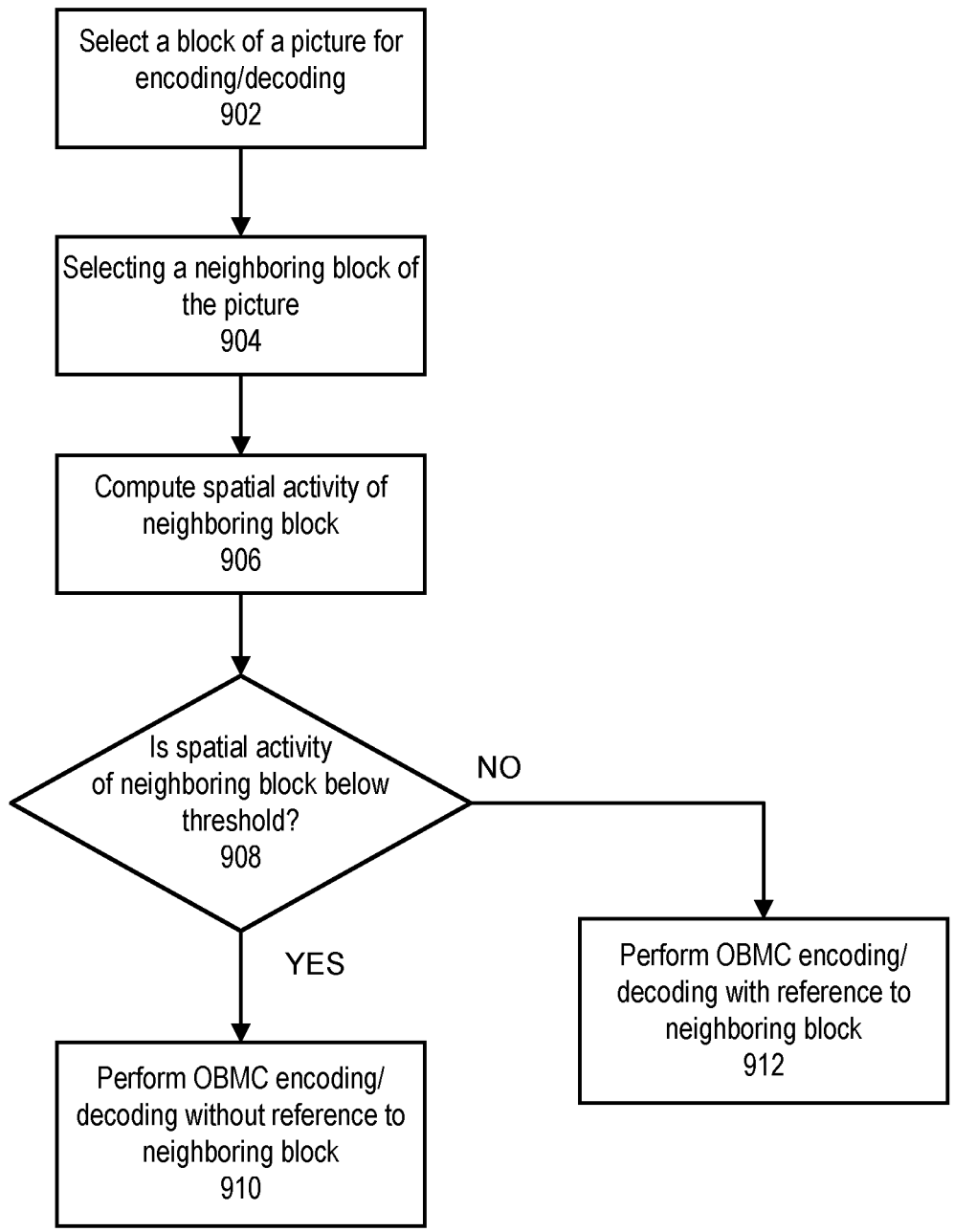

Some embodiments may compute the spatial activity metric on a neighbouring block, and not include the neighbouring block for OMBC of the current block if the sum of spatial activity metric for the neighbouring block is below a spatial activity threshold. For example, referring to FIG. 9, systems/methods according to some embodiments may select a block of a picture for encoding/decoding (block 902). The systems/methods may then select a neighbouring block of the picture (block 904) and compute the spatial activity of the neighbouring block (block 906), using, for example, Equation [2]. The systems/methods then compare the spatial activity of the neighbouring block to a threshold (block 908), and if the spatial activity of the neighbouring block is below the threshold, the systems/methods may perform OBMC encoding/decoding on the selected block without reference to the neighbouring block (block 910). Otherwise, operations proceed to block 912 and OBMC is performed on the selected block with reference to the neighbouring block.

In some embodiments, the spatial activity threshold may be fixed and signaled in a parameter set, for example, in a sequence parameter set (SPS), picture parameter set (PPS) or slice header. In this manner, for example, an encoder can signal the spatial activity threshold to a decoder.

Figure 1:
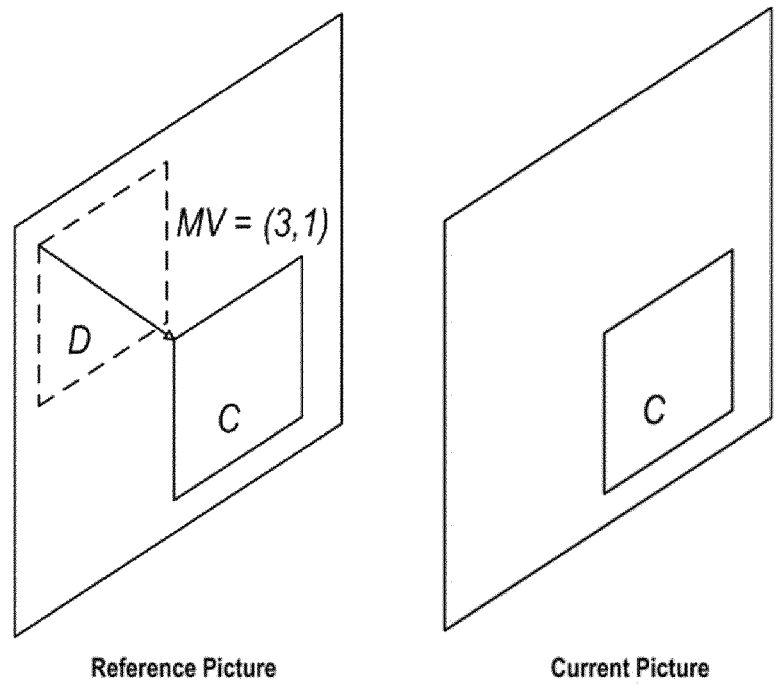
FIG. 1 is a schematic illustration of a motion vector used in video encoding/decoding.
Figure 2:
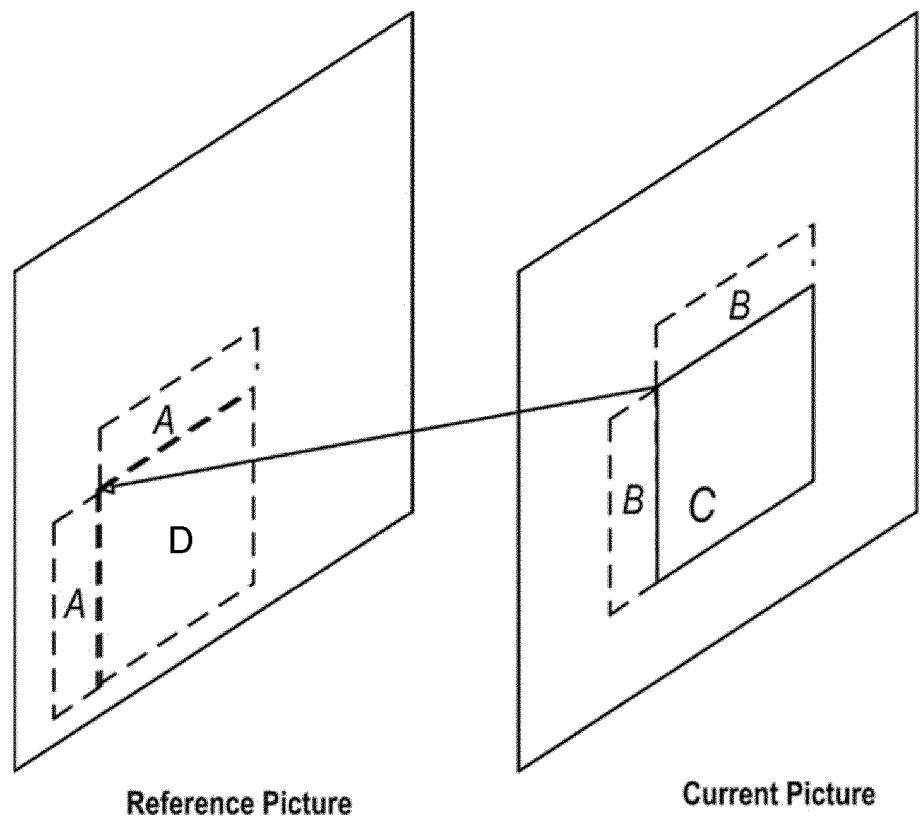
FIG. 2 is a schematic illustration of local illumination compensation in video encoding/decoding.
Figure 3:
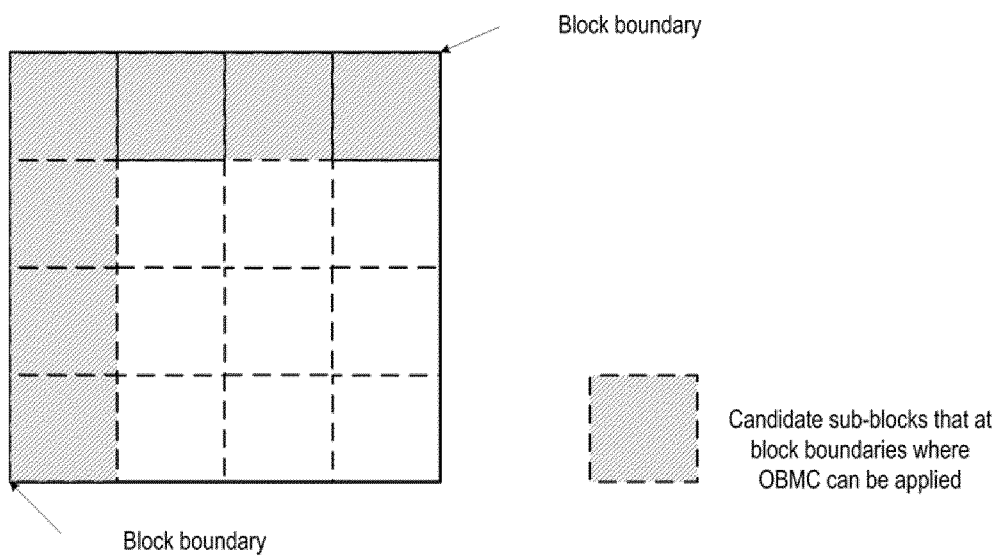
FIGS. 3 and 4 are schematic illustrations of overlapped block motion compensation in video encoding/decoding.
Figure 4:
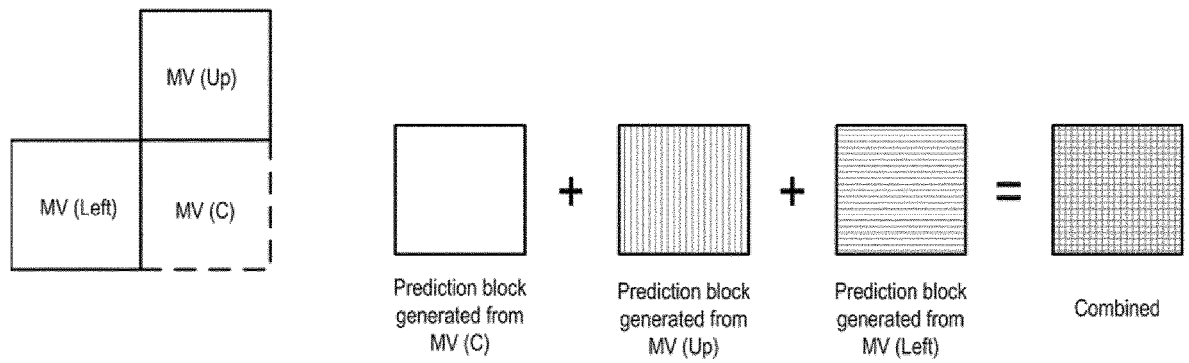
Figure 5:
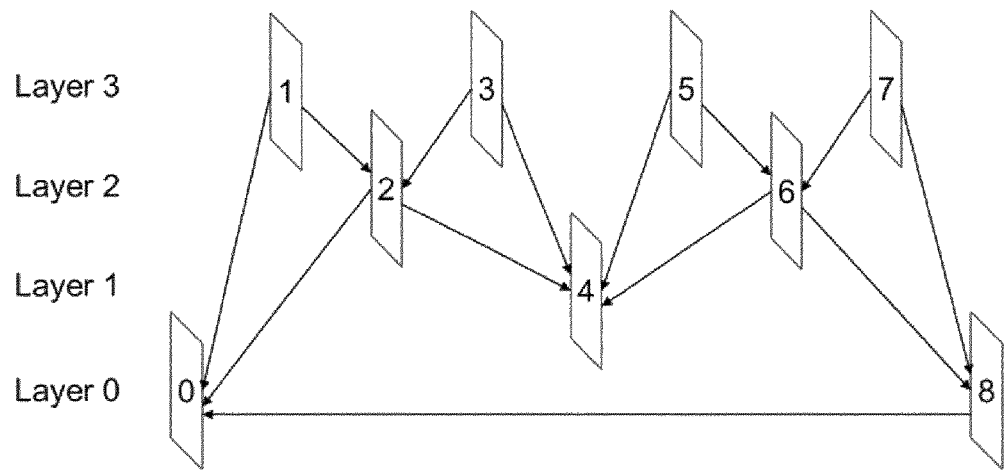
FIG. 5 schematically illustrates hierarchical picture coding.
Figure 6:
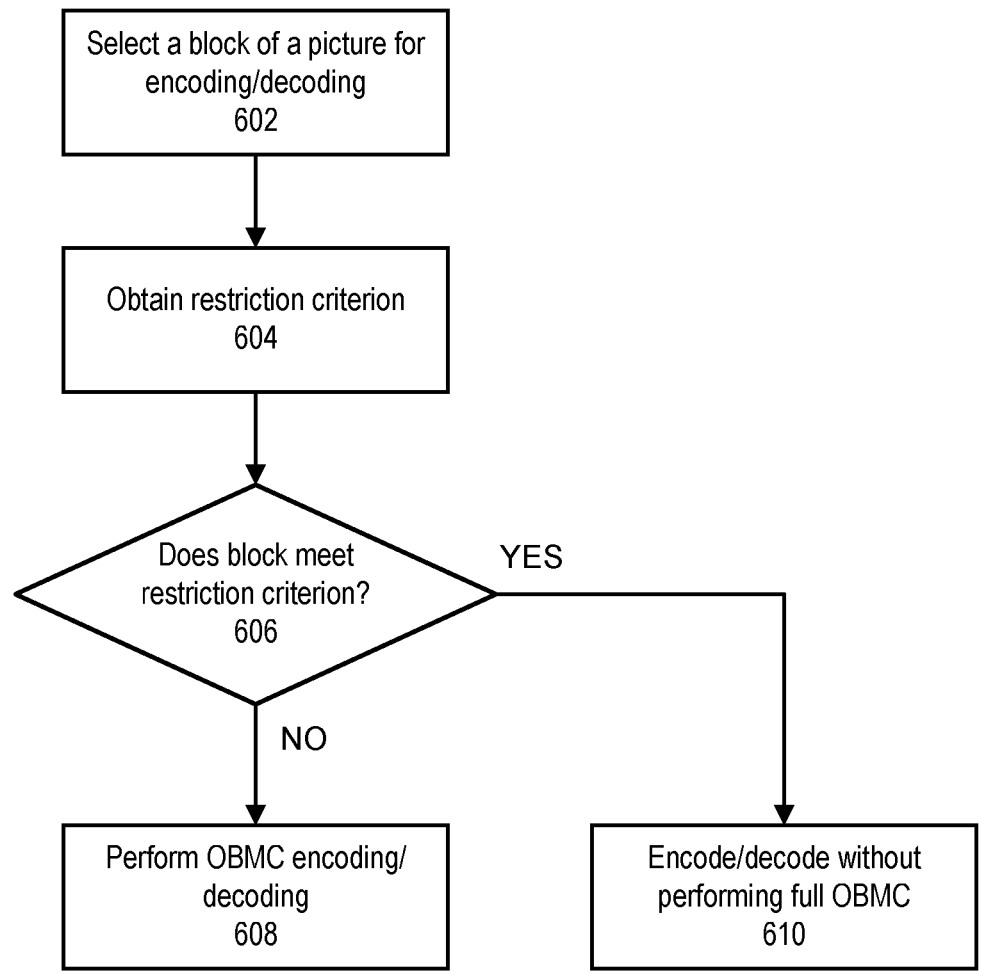
FIGS. 6, 7, 8, 9, 10, 11A, 11B, 12, 13, 14 and 15 are flowcharts illustrating operations of systems/methods according to some embodiments.

In some embodiments, the spatial activity threshold may be fixed for each picture or slice but may be dependent on the hierarchy level of the coding structures. For example, when the picture or slice being encoded/decoded is at higher hierarchy level (as shown in FIG. 5), the threshold may be adjusted lower, and when the picture or slice is at a lower hierarchy level, the threshold may be adjusted higher.

In some embodiments, the spatial activity threshold is made dependent on the quantization parameter (QP). For high QP values, as blocks tend to suffer from coarse quantization, the spatial activity threshold may be made lower. For low QP values, as blocks get fine quantization, the spatial activity threshold may be made higher.

In still further embodiments, the LIC parameter of the current block may be considered as part of evaluating the OBMC restriction criterion. For example, in some embodiments, the LIC parameter of the current block and the neighbouring blocks may be compared. One alternative is to compare the LIC flags, and when the LIC flags are different, then OBMC may be skipped.

Figure 10:
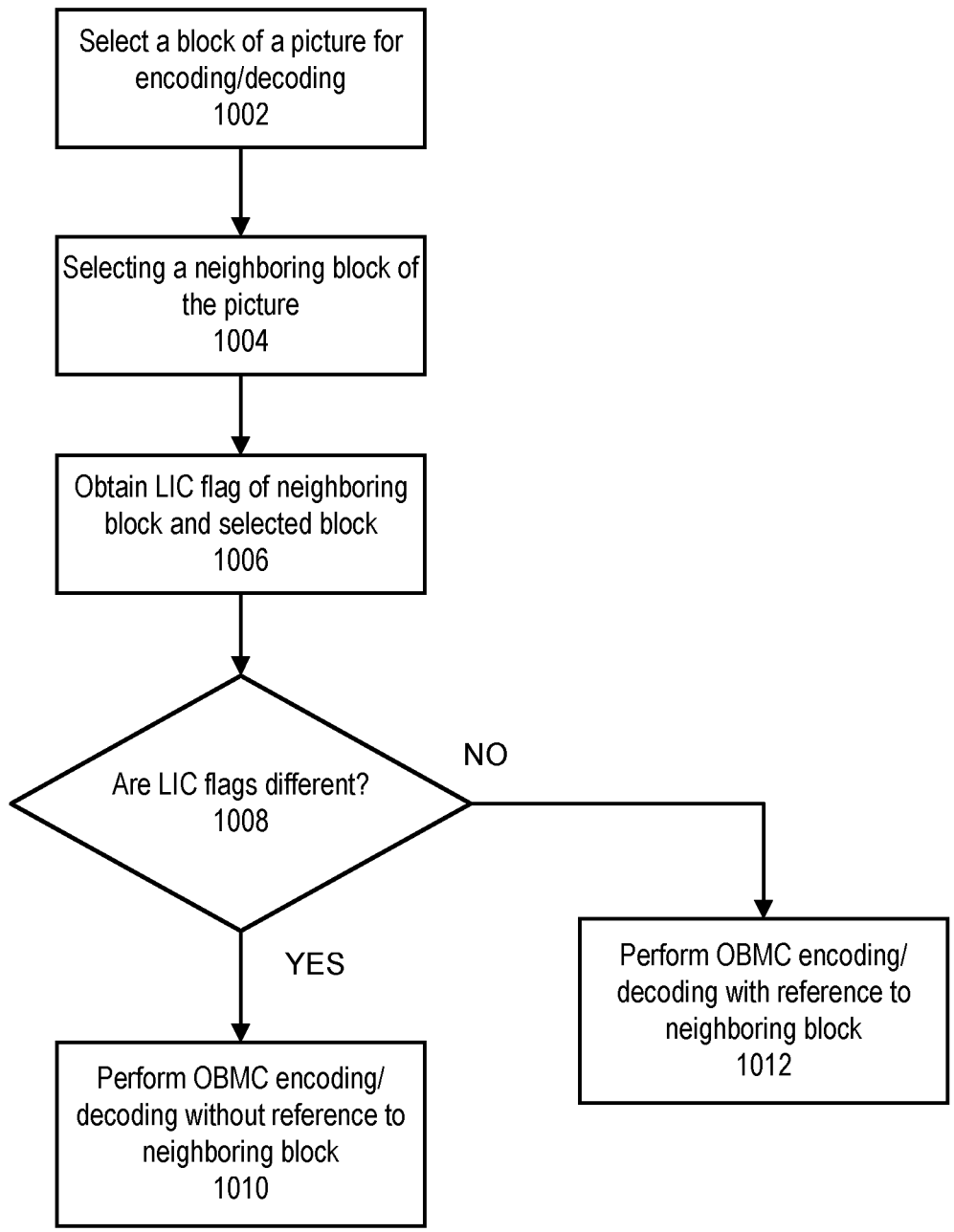

For example, referring to FIG. 10, systems/methods according to some embodiments may select a block of a picture for encoding/decoding (block 1002). The systems/methods may then select a neighbouring block of the picture (block 1004) and obtain the LIC flags for both the selected block and the neighbouring block (block 1006). The systems/methods then compare the LIC flag of the neighbouring block to the LIC flag of the selected block (block 1008), and if the flags are different, the systems/methods may perform OBMC encoding/decoding on the selected block without reference to the neighbouring block (block 1010). Otherwise (i.e., if the LIC flags are the same), operations proceed to block 1012 and OBMC is performed on the selected block with reference to the neighbouring block.

In further embodiments, when both blocks are LIC enabled, then the weight (W) and offset (O) parameters of LIC may be checked. Assuming the current block has weight (W0) and offset (O0), the neighbouring block has weight (W1) and offset (O1), a delta weight $\Delta W=|W0-W1|$ and a delta offset $\Delta O=|O0-O1|$ are calculated. If $\Delta W$ or $\Delta O$ exceeds a threshold, then OBMC may be skipped. For example, the threshold for $\Delta W$ can be 1, and the threshold of $\Delta O$ can be 16<<(bit_depth−8).

Figure 11A:
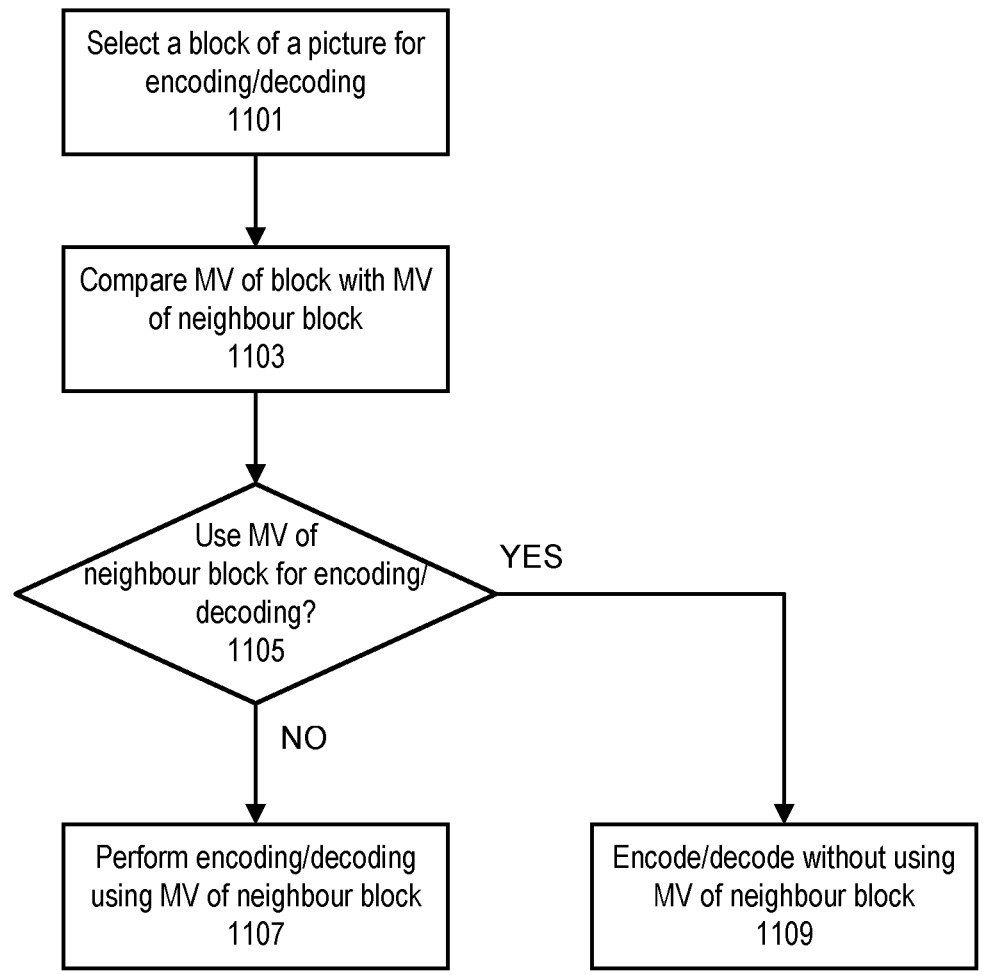

Operations of systems/methods for encoding/decoding a picture of a video signal according to some embodiments are illustrated in FIG. 11A. Referring to FIG. 11A, in some embodiments, a processing apparatus, which may be an encoder or decoder, selects (1101) a block of a picture for encoding/decoding, compares (1103) a motion vector associated with the selected block to a motion vector associated with a neighbouring block that is adjacent the block, determines (1105) whether to use motion vectors associated with the neighbouring block in encoding/decoding of the block based on the comparison of the motion vector associated with the selected block and the motion vector associated with the neighbouring block, and then encodes/decodes the block using the MV of the neighbor block (block 1107) or without the MV of the neighbor block (block 1109) based on the determination.

More particularly, in some embodiments, a difference between motion vectors (MVs) between the selected block and the neighbouring block may be used in the OBMC criterion.

For example, in some embodiments, the MV difference ($\Delta MVx$, $\Delta MVy$) between the current MV (MV0) and the neighbouring MV (MV1) is calculated, for example, according to Equations [6.1] and [6.2] as follows:

$$\Delta MVx=|MV0\cdot x-MV1\cdot x| \qquad [6.1]$$

$$\Delta MVy=|MV0\cdot y-MV1\cdot y| \qquad [6.2]$$

If both the differences are below a predetermined threshold, OBMC may be skipped. In some embodiments, the $\Delta MV$ threshold may be set to a fraction of a sample. For example, in some embodiments, the $\Delta MV$ threshold may be set to $\frac{1}{16}$th sample. A small $\Delta MV$ indicates that the current MV might already capture the correct motion for the area. On the other hand, applying a neighbouring MV with only small sample displacements away may not bring noticeable differences.

Figure 11B:
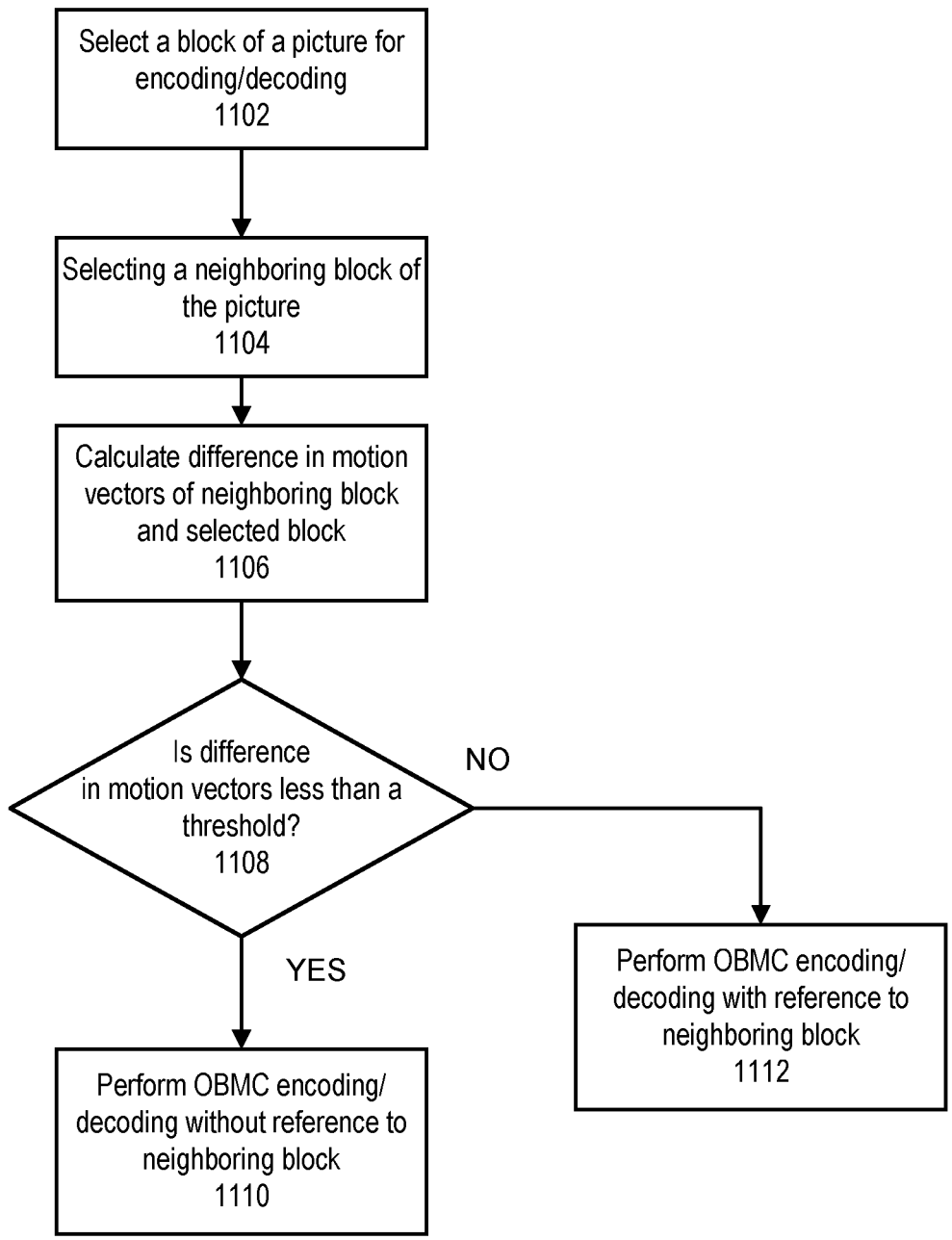

Accordingly, referring to FIG. 11B, systems/methods according to some embodiments may select a block of a picture for encoding/decoding (block 1102). The systems/methods may then select a neighbouring block of the picture (block 1104) and calculate a difference in the motion vectors of the selected block and the neighbouring block (block 1106). The systems/methods then compare the difference in the motion vectors to a threshold (block 1108), and if the difference in the motion vectors is less than the threshold, the systems/methods may perform OBMC encoding/decoding on the selected block without reference to the neighbouring block (block 1110). Otherwise, operations proceed to block 1112 and OBMC is performed on the selected block with reference to the neighbouring block.

Figure 12:
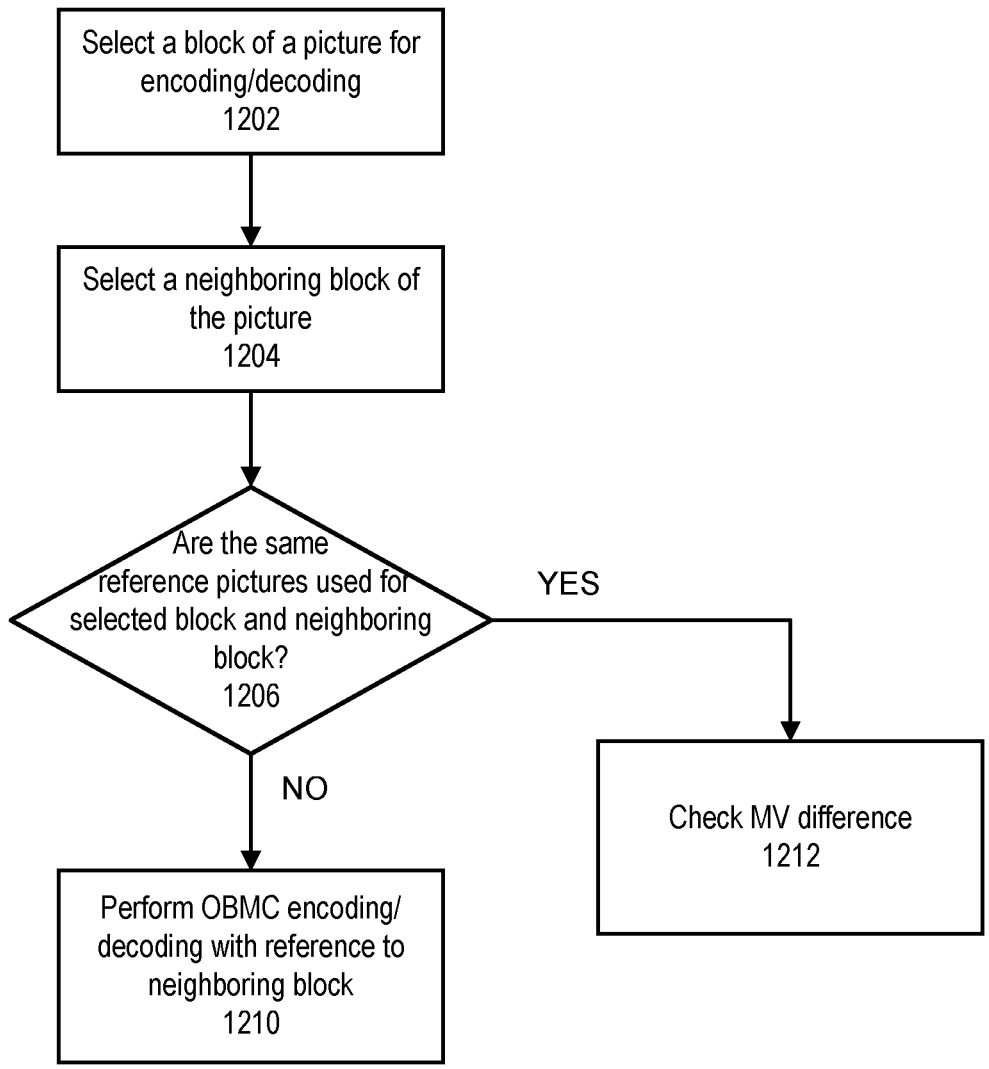

Referring to FIG. 12, in some embodiments, after selecting the block for encoding/decoding (block 1202) and selecting a neighbouring block (1204), the systems/methods may check to see if the same reference pictures are used for the current block's MV and the neighbouring block's MV (block 1206), and if so the MV difference as above may additionally be checked (block 1212). If the reference pictures are not the same, OBMC is performed with reference to the neighbouring block (block 1210).

Figure 13:
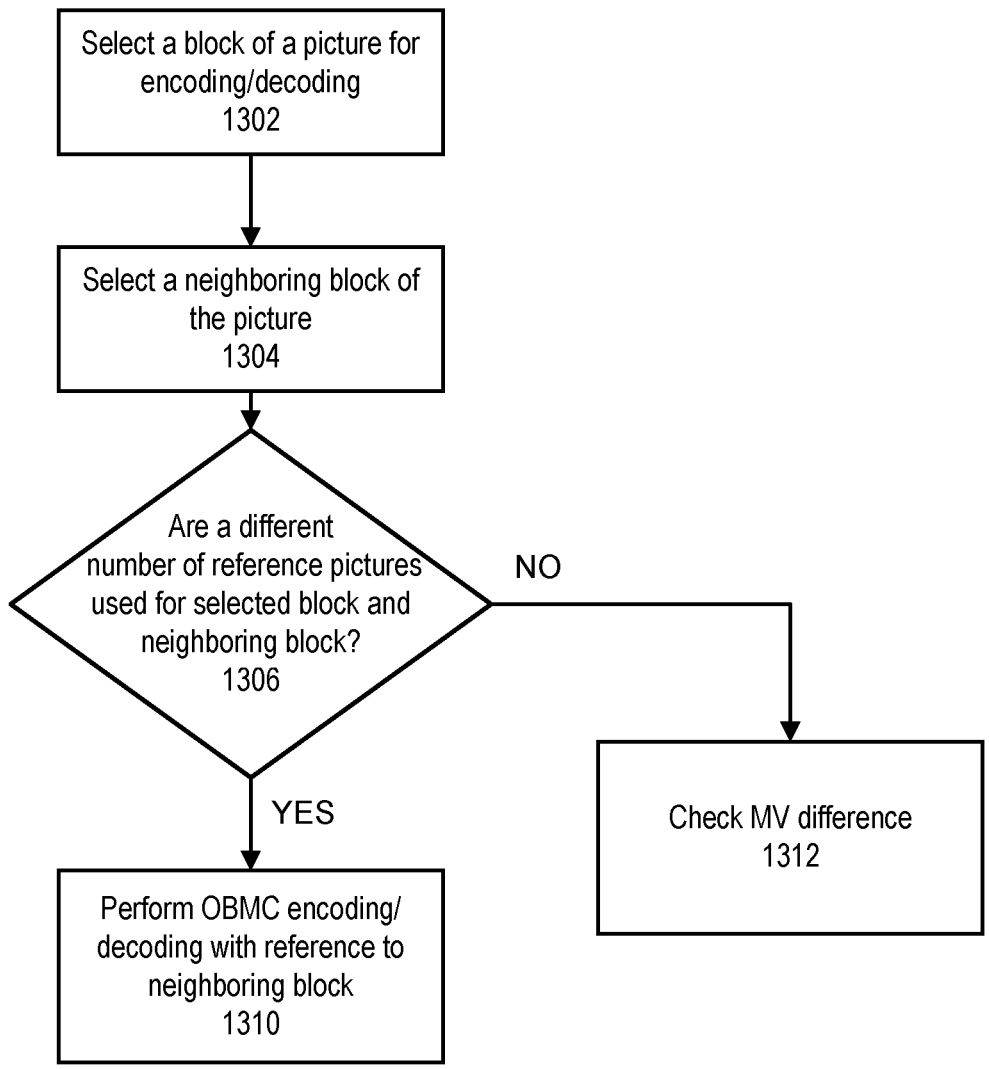

Referring to FIG. 13, in further embodiments, after selecting the block for encoding/decoding (block 1302) and selecting a neighbouring block (1304), the systems/methods may check to see if a different number of reference pictures is used for the current block's hypothesis and that of the neighbouring block (block 1306), and if so, then OBMC is performed with reference to the neighbouring block (block 1310). If the number of reference pictures are the same, then the abovementioned reference picture check and the MV difference check can be applied (block 1312).

Figure 14:
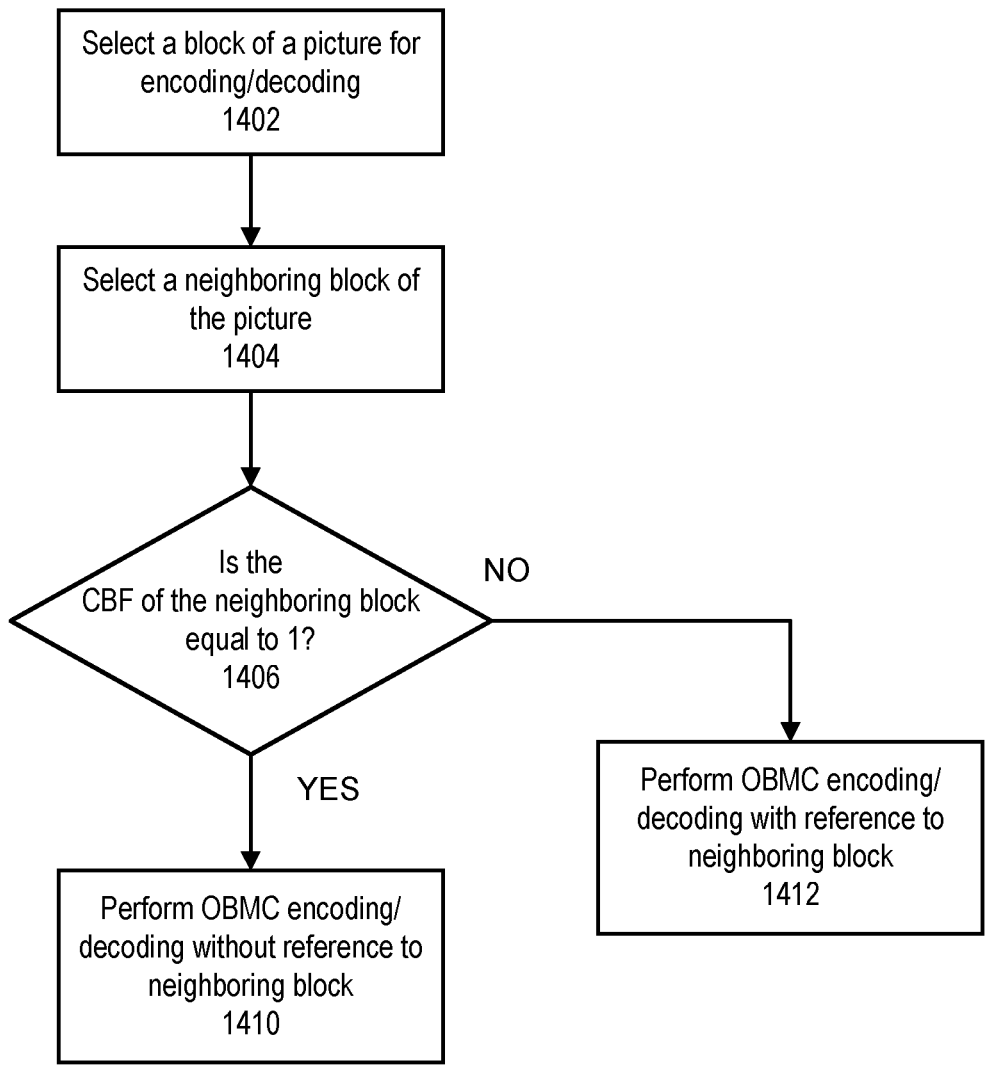

Some embodiments may use a coded block flag (CBF) in the OBMC criterion. For example, referring to FIG. 14, after selecting the block for encoding/decoding (block 1402) and selecting a neighbouring block (1404), the CBF of the neighbouring block may be checked (block 1406). The CBF flag indicates the presence of non-zero coefficients inside a block. When the neighbouring block has CBF=1, then OBMC may be skipped for that block (block 1410). Otherwise the neighbouring block may be used for OBMC unless excluded based on another criterion. The systems/methods can also check the number of non-zero coefficients in the neighbouring block, and if the number exceeds a certain threshold, then OBMC may be performed without reference to the neighbouring block.

In still further embodiments, the temporal distance of the current block's reference picture (POC0) with the neighbouring block's reference picture (POC1) may be used in the OBMC criterion.

Figure 15:
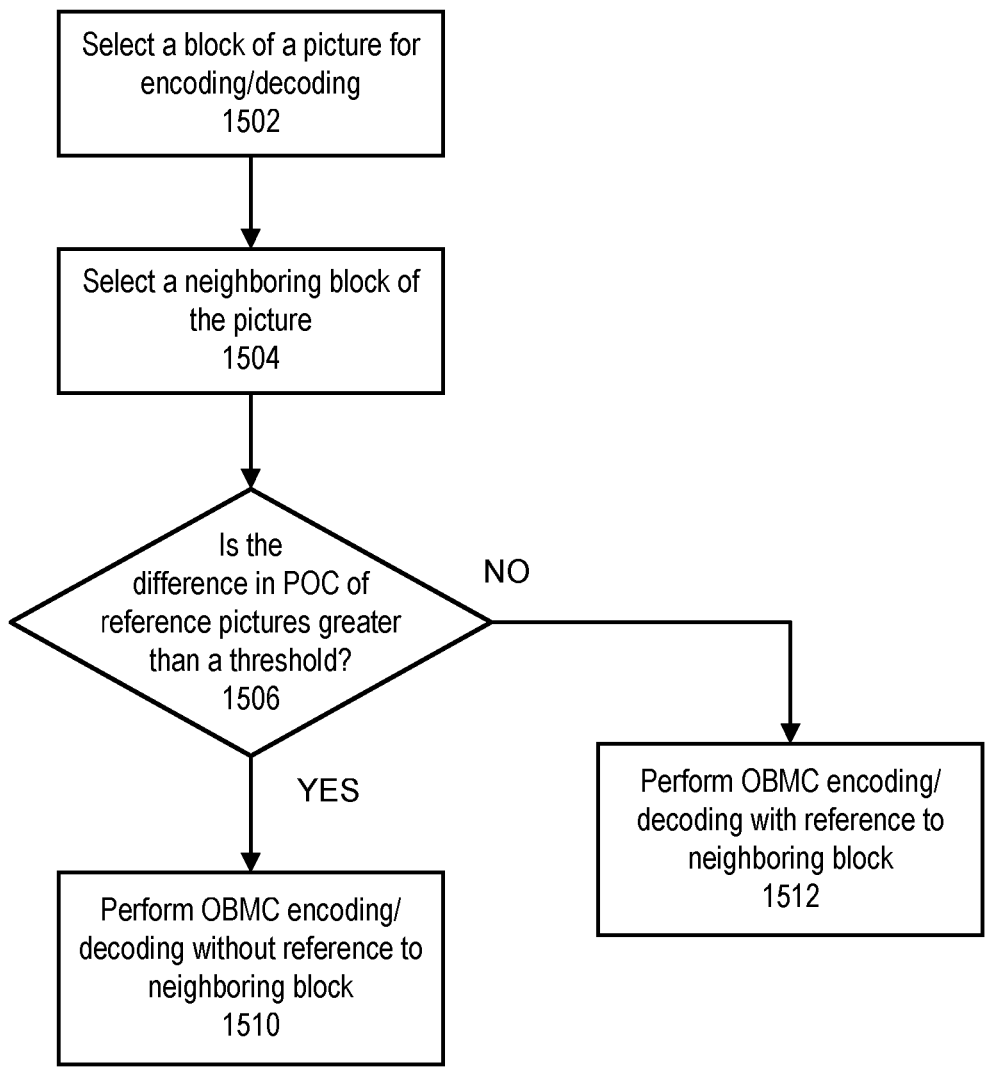

For example, referring to FIG. 15, after selecting the block for encoding/decoding (block 1502) and selecting a neighbouring block (1504), the temporal distance of the current block's reference picture (POC0) with the neighbouring block's reference picture (POC1) may be checked (block 1506). The temporal distance can be measured by calculating the POC value difference, i.e. $\Delta POC=|POC0-POC1|$. If the temporal distance or $\Delta POC$ is larger than a threshold, then OBMC may be skipped (block 1510). Otherwise, the neighbouring block may be used for OBMC (block 1512) unless excluded by another criterion.

It will be appreciated that any two or more of the previously described embodiments may be combined to form the OBMC criterion. For example, both the MV and spatial activity may be considered in determining whether or not to apply OBMC to a current block.

It will be further appreciated that the above described embodiments may be applied only when the OBMC operation is implicitly enabled for the current block or the current OBMC flag is implicitly derived to be 1.

Some embodiments may define a maximum number of neighbouring motion hypotheses that are used for OBMC of a current sub-block. One example is to set the maximum number to two. Another example is to set the maximum number to one. This can be done separately or together with other embodiments described herein.

In addition, when a maximum number is reached, neighbouring MV hypotheses may be selected for inclusion in the OBMC calculation based on priority. The priority can be based on at least one of a spatial activity metric, MV difference or POC difference as defined above.

Some further embodiments may apply at least one deblocking decision on at least one boundary between a current block and a neighbouring block. If deblocking is applied for the block boundary with the neighbouring block, the systems/methods may not apply OBMC using the MV hypothesis from the neighbouring block.

Similarly, OBMC may not be applied in some embodiments when no residual is added to the current prediction, e.g. the current block is a skip block.

The effect of implementing OBMC restriction according to some embodiments described herein is illustrated in Tables 1 and 2 below.

TABLE 1

Results of using one variant of spatial activity
(with QP dependent threshold) restriction.

| | Over HM-16.6-JEM-7.0 (parallel) | | | | |
|---|---|---|---|---|---|
| | Y | U | V | EncT | DecT |
| Class A1 | 0.05% | −0.48% | 0.21% | 96% | 91% |
| Class A2 | 0.04% | 0.39% | 0.88% | 94% | 91% |
| Class B | 0.03% | 0.00% | 0.11% | 97% | 96% |
| Class C | 0.01% | 0.10% | 0.05% | 99% | 98% |
| Class D | 0.00% | 0.10% | 0.19% | 99% | 98% |
| Class E /Overall (Ref) | 0.03% | 0.02% | 0.28% | 97% | 95% |

TABLE 2

Results of using spatial activity (with QP dependent
threshold) restriction and LIC flag restriction.

| | Over HM-16.6-JEM-7.0 (parallel) | | | | |
|---|---|---|---|---|---|
| | Y | U | V | EncT | DecT |
| Class A1 | 0.04% | −0.39% | 0.30% | 95% | 90% |
| Class A2 | 0.13% | 0.51% | 1.04% | 93% | 91% |
| Class B | 0.01% | −0.06% | 0.20% | 96% | 96% |
| Class C | 0.05% | −0.01% | 0.04% | 97% | 98% |
| Class D | 0.00% | 0.10% | −0.04% | 98% | 98% |
| Class E | | | | | |
| Overall (Ref) | 0.04% | 0.03% | 0.30% | 96% | 95% |

Table 1 illustrates the effects of implementing OBMC restriction based on spatial activity with a QP dependent threshold. Table 2 illustrates the effects of implementing OBMC restriction based on spatial activity with a QP dependent threshold and an LIC flag restriction. The table entries for the signal components (Y, U, V) represent the additional bit rate needed to obtain a similar level of quality in the encoded pictures for different kinds of sequences. EncT and DecT represent the encoding time and decoding time, respectively. Tables 1 and 2 indicate that only slightly higher bit rates are needed to achieve similar levels of quality when OBMC restriction is employed. However, the encoding and decoding times are reduced by 3 to 5%, which is a significant improvement.

Figure 16:
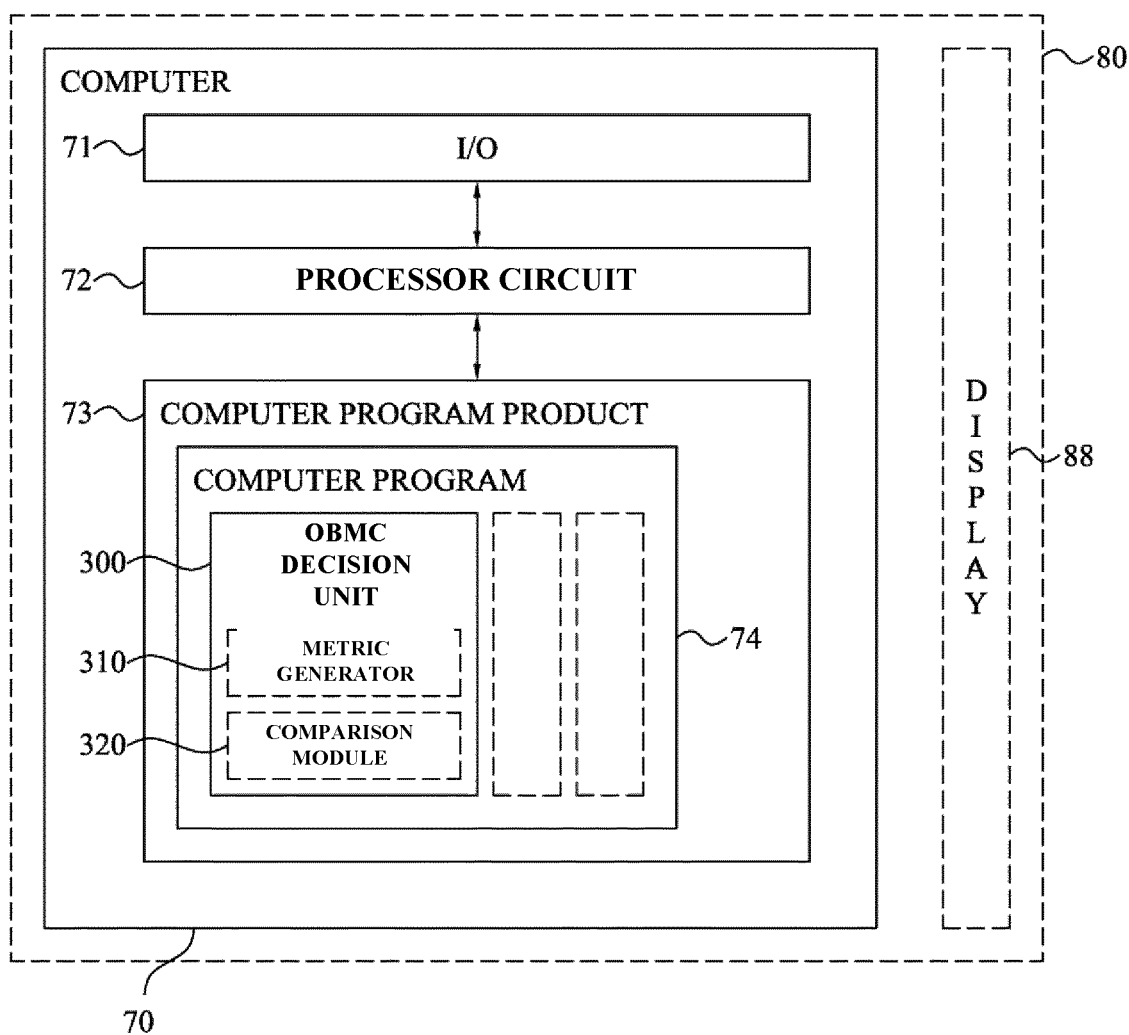
FIG. 16 is a schematic block diagram of a software implementation of a deblocking filter module in a computer according to some embodiments.

FIG. 16 schematically illustrates an embodiment of a computer 70 having a processor circuit 72, such as a DSP (Digital Signal Processor) or CPU (Central Processing Unit). The processor circuit 72 can be a single unit or a plurality of units for performing different operations described herein. The computer 70 also includes an input/output (I/O) unit 71 for receiving recorded or generated video frames or encoded video frames and encoded video frame or decoded video data. The I/O unit 71 has been illustrated as a single unit in FIG. 16 but can likewise be in the form of a separate input unit and a separate output unit.

Furthermore, the computer 70 includes at least one computer program product 73 in the form of a non-volatile memory, for instance an EEPROM (Electrically Erasable Programmable Read-Only Memory), a flash memory or a disk drive. The computer program product 73 includes a computer program 74, which includes code means which when run on the computer 70, such as by the processor circuit 72, causes the computer 70 to perform the operations of the methods described above. Hence, in an embodiment the code means in the computer program 74 includes a metric generating module 310 for generating a metric to be used as an OBMC criterion and a comparison module 320 for comparing the metric to a threshold. These modules 310, 320 essentially perform the operations described above when run on the processor circuit 72.

The computer 70 of FIG. 10 can be a user equipment or be present in a user equipment 80. In such a case, the user equipment 80 may additionally include or be connected to a display 88 to display video data.

The operations described herein may be used in video coding, and in particular may be implemented both in a video encoder and in a video decoder. The video decoder can be implemented preferably in hardware but also in software. The same holds for the video encoder.

Figure 17:
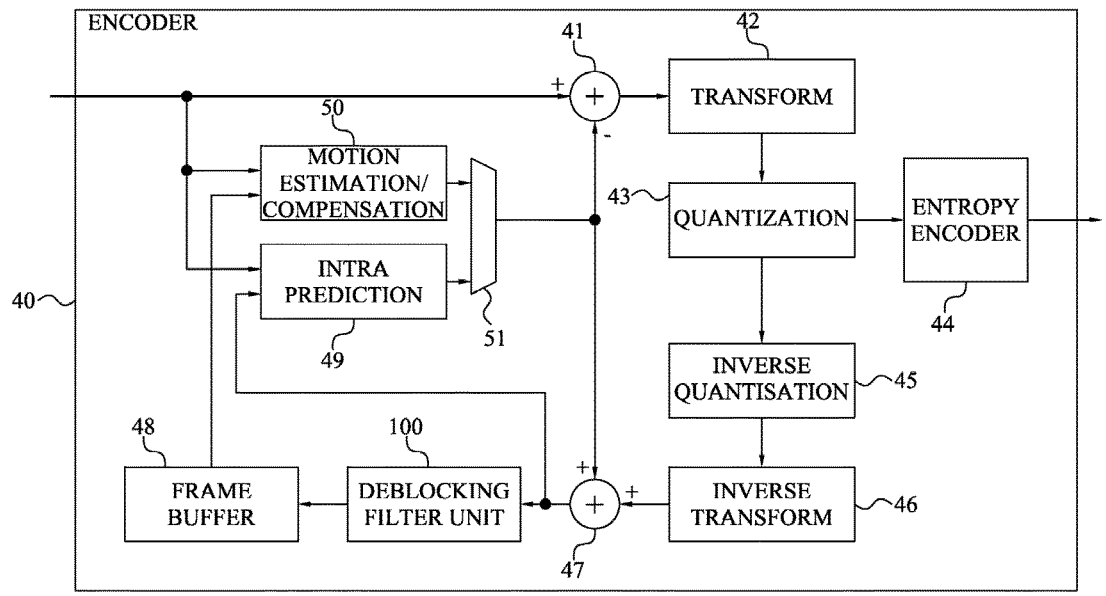
FIG. 17 is a schematic block diagram of an encoder according to some embodiments.

FIG. 17 is a schematic block diagram of an encoder 40 for encoding a block of samples in a video frame of a video sequence according to some embodiments.

A current block of samples is predicted by performing a motion estimation by a motion estimator 50 from an already provided block of samples in the same frame or in a previous frame. The result of the motion estimation is a motion or displacement vector associated with the reference block, in the case of inter prediction. The motion vector is utilized by a motion compensator 50 for outputting an inter prediction of the block of samples.

An intra predictor 49 computes an intra prediction of the current block of samples. The outputs from the motion estimator/compensator 50 and the intra predictor 49 are input in a selector 51 that either selects intra prediction or inter prediction for the current block of samples. The output from the selector 51 is input to an error calculator in the form of an adder 41 that also receives the sample values of the current block of samples. The adder 41 calculates and outputs a residual error as the difference in sample values between the block of samples and its prediction.

The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block of samples.

The transformed and quantized residual error for the current block of samples is also provided to a inverse quantizer 45 and inverse transformer 46 to retrieve the original residual error. This error is added by an adder 47 to the block prediction output from the motion compensator 50 or the intra predictor 49 to create a reference block of samples that can be used in the prediction and coding of a next block of samples. This new reference block is first processed by a deblocking filter unit 100 in order to perform deblocking filtering to combat any blocking artifact. The processed new reference block is then temporarily stored in a frame buffer 48, where it is available to the intra predictor 49 and the motion estimator/compensator 50.

Figure 18:
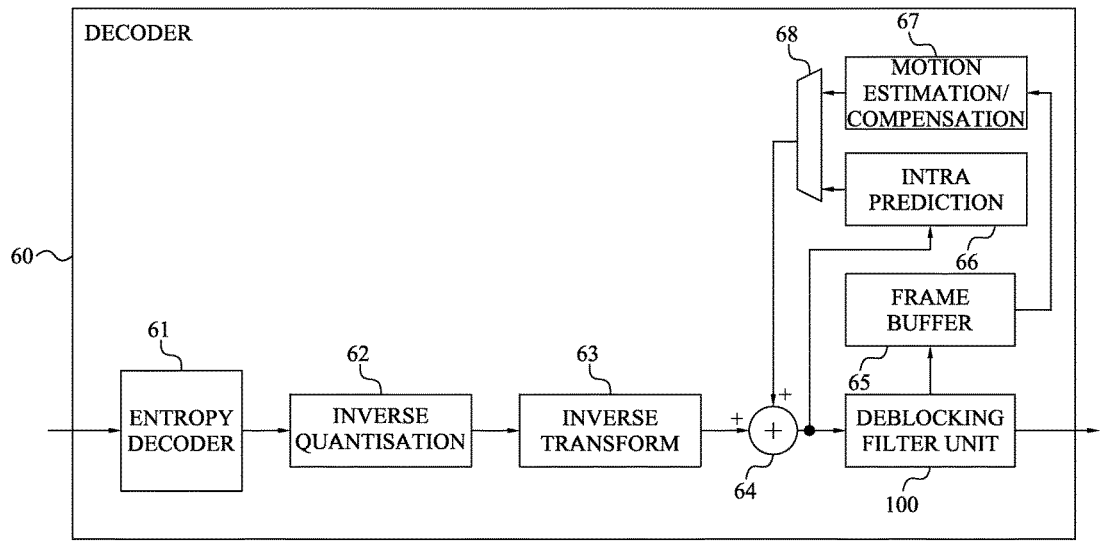
FIG. 18 is a schematic block diagram of a decoder according to some embodiments.

FIG. 18 is a corresponding schematic block diagram of a decoder 60 including a deblocking filter unit 100 according to the embodiments. The decoder 60 includes a decoder 61, such as an entropy decoder, for decoding an encoded representation of a block of samples to get a set of quantized and transformed residual errors. These residual errors are dequantized in an inverse quantizer 62 and inverse transformed by an inverse transformer 63 to get a set of residual errors.

These residual errors are added in an adder 64 to the sample values of a reference block of samples. The reference block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded block of samples output form the adder 64 is input to a deblocking filter unit 100 according to the embodiments in order to deblocking filter any blocking artifacts. The filtered block of samples is output form the decoder 60 and is furthermore preferably temporarily provided to a frame buffer 65 and can be used as a reference block of samples for a subsequent block of samples to be decoded. The frame buffer 65 is thereby connected to the motion estimator/compensator 67 to make the stored blocks of samples available to the motion estimator/compensator 67.

The output from the adder 64 is preferably also input to the intra predictor 66 to be used as an unfiltered reference block of samples.

Figure 19:
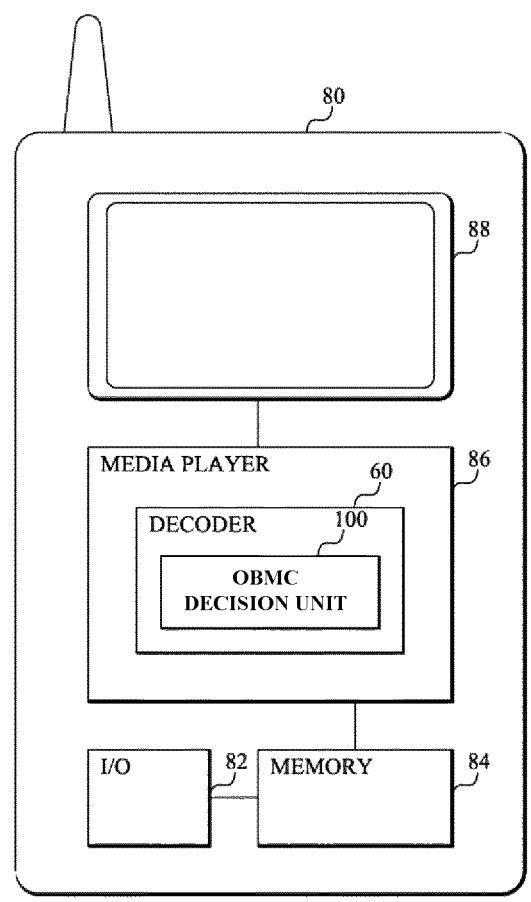
FIG. 19 is a schematic block diagram of a user equipment according to some embodiments.

FIG. 19 is a schematic block diagram of a user equipment or media terminal 80 housing a decoder 60 according to some embodiments. The user equipment 80 can be any device having media decoding functions that operates on an encoded video stream of encoded video frames to thereby decode the video frames and make the video data available. Non-limiting examples of such devices include mobile telephones and other portable media players, tablets, desktops, notebooks, personal video recorders, multimedia players, video streaming servers, set-top boxes, TVs, computers, decoders, game consoles, etc. The user equipment 80 includes a memory 84 configured to store encoded video frames. These encoded video frames can have been generated by the user equipment 80 itself. In such a case, the user equipment 80 preferably includes a media engine or recorder together with a connected encoder, such as the encoder of FIG. 17. Alternatively, the encoded video frames are generated by some other device and wirelessly transmitted or transmitted by wire to the user equipment 80. The user equipment 80 then includes a transceiver (transmitter and receiver) or input and output port 82 to achieve the data transfer.

The encoded video frames are brought from the memory 84 to a decoder 60, such as the decoder illustrated in FIG. 18. The decoder 60 then decodes the encoded video frames into decoded video frames. The decoded video frames are provided to a media player 86 that is configured to render the decoded video frames into video data that is displayable on a display or screen 88 of or connected to the user equipment 80.

In FIG. 19, the user equipment 80 has been illustrated as including both the decoder 60 and the media player 86, with the decoder 60 implemented as a part of the media player 86. This should, however, merely be seen as an illustrative but non-limiting example of an implementation embodiment for the user equipment 80. Also distributed implementations are possible where the decoder 60 and the media player 86 are provided in two physically separated devices are possible and within the scope of user equipment 80 as used herein. The display 88 could also be provided as a separate device connected to the user equipment 80, where the actual data processing is taking place.

Figure 20:
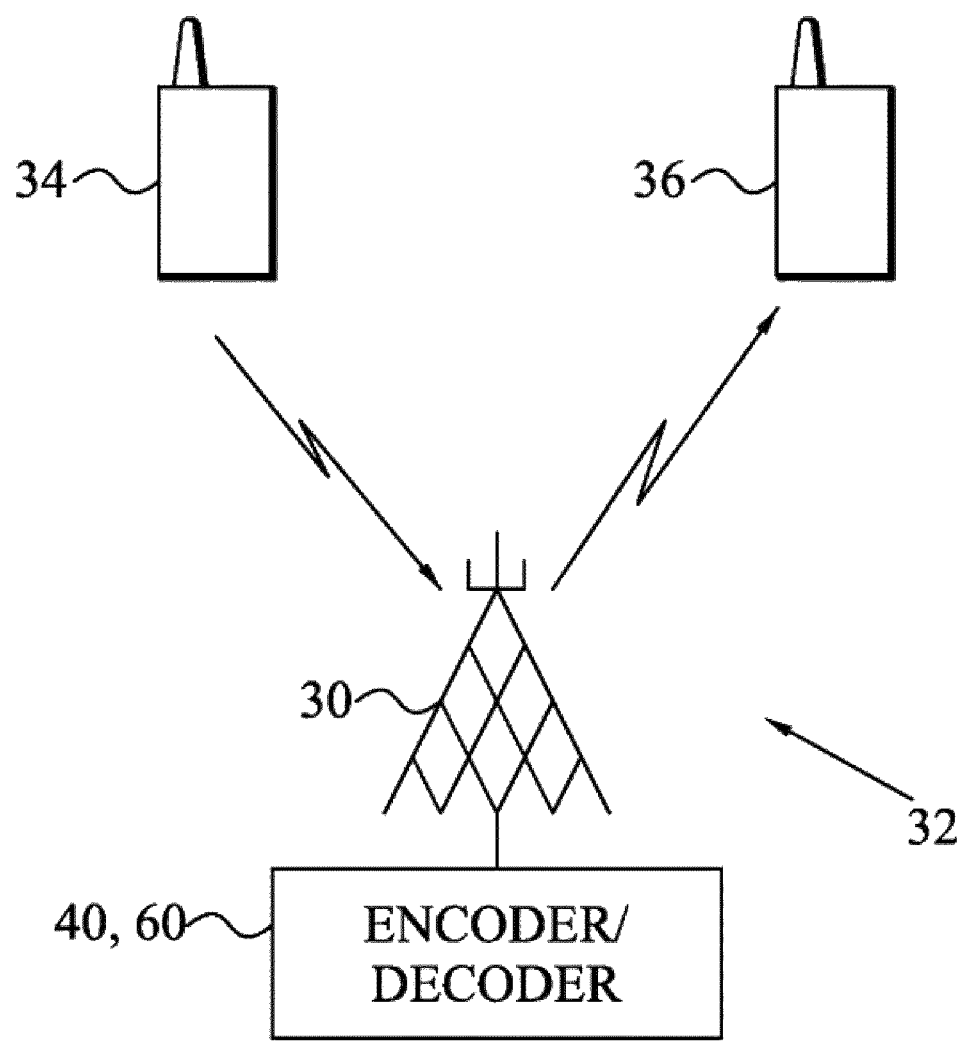
FIG. 20 is a schematic overview of a portion of a communication network comprising a network device according to some embodiment.

Referring to FIG. 20, the encoder 40 and/or decoder 60, such as illustrated in FIGS. 17 and 18, may be implemented in a network device being or belonging to a network node in a communication network 32 between a sending unit 34 and a receiving user equipment 36. Such a network device 30 may be a device for converting video according to one video coding standard to another video coding standard, for example, if it has been established that the receiving user equipment 36 is only capable of or prefers another video coding standard than the one sent from the sending unit 34. The network device 30 can be in the form of or included in a radio base station, a Node-B or any other network node in a communication network 32, such as a radio-based network.

LIST OF ACRONYMS AND ABBREVIATIONS

Abbreviation Meaning

AMVP Advanced Motion Vector Prediction
ATMVP Alternative Temporal Motion Vector Prediction
CBF Coded Block Flag
EEPROM Electrically Erasable Programmable Read-Only Memory
GOP Group of Pictures HEVC High Efficiency Video Coding
JEM Joint Exploration Model
LIC Local Illumination Compensation
MV Motion Vector
OBMC Overlapped Block Motion Compensation
PMMVD Pattern Matched Motion Vector Derivation
POC Picture Order Count
PPS Picture Parameter Set
QP Quantization Parameter
STMVP Spatial-Temporal Motion Vector Predictor Further Definitions and Embodiments The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments of the present inventive concepts are described herein with reference to the accompanying drawings, in which embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the inventive concepts belongs. It will be further understood that terms used herein should be interpreted as having a meaning that is consistent with their meaning in the context of this specification and the relevant art.

As will be appreciated by one of skill in the art, the present inventive concepts may be embodied as a method, computing device, and/or computer program product. Accordingly, the present inventive concepts may take the form of an entirely hardware embodiment, an entirely software embodiment or an embodiment combining software and hardware aspects all generally referred to herein as a "circuit" or "module." Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

The embodiments described herein provide useful physical machines and particularly configured computer hardware arrangements of computing devices, servers, processors, memory, networks, for example. Components of the computer may include, but are not limited to, a processing unit including a processor circuit, such as a programmable microprocessor or microcontroller, a system memory, and a system bus that couples various system components including the system memory to the processor circuit.

The processor circuit may be a multi-core processor including two or more independent processor circuits. Each of the cores in the processor circuit may support multi-threading operations, i.e., may have the capability to execute multiple processes or threads concurrently. Additionally, the processor circuit may have an on-board memory cache. In general, the processor circuit may, for example, include any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically includes a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic disk storage or other magnetic storage devices, or any other medium which can be used to store the desired information and which can accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processor circuit. The system memory may store an operating system, application programs, other program modules, and program data.

The computer may also include other removable/non-removable, volatile/nonvolatile computer storage media. By way of example only, the computer may include a hard disk drive reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface.

The drives and their associated computer storage media discussed above provide storage of computer readable instructions, data structures, program modules and other data for the computer. A user may enter commands and information into the computer through input devices such as a keyboard and pointing device, commonly referred to as a mouse, trackball or touch pad. Other input devices (not shown) may include a microphone, joystick, game pad, satellite dish, scanner, touchscreen, or the like. These and other input devices are often connected to the processor circuit through a user input interface that is coupled to the system bus, but may be connected by other interface and bus structures, such as a parallel port, game port or a universal serial bus (USB). A monitor or other type of display device is also connected to the system bus via an interface, such as a video interface. In addition to the monitor, computers may also include other peripheral output devices such as speakers and a printer, which may be connected through an output peripheral interface.

The computer may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections include a local area network (LAN) connection and a wide area network (WAN) connection, but may also include other networks. Such networking environments are commonplace in offices, enterprise-wide computer networks, intranets and the Internet.

When used in a LAN networking environment, the computer may be connected to the LAN through a network interface or adapter. When used in a WAN networking environment, the computer may include a modem or other means for establishing communications over the WAN. The modem, which may be internal or external, may be connected to the system bus via the user input interface, or other appropriate mechanism.

Some embodiments of the present inventive concepts are described herein with reference to flowchart illustrations and/or block diagrams of methods, systems and computer program products according to embodiments of the inventive concepts. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program instructions may be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

The invention claimed is:

1. A method of decoding a picture of a video signal, comprising:
   selecting a block of the picture for decoding;
   estimating a spatial activity of the block, wherein estimating the spatial activity of the block comprises calculating a spatial activity of at least one sample of the block according to the formula:

$$\Delta P_{i,j} = |4*P_{i,j} - P_{i-1,j} - P_{i+1,j} - P_{i,j-1} - P_{i,j+1}|,$$

where $P_{i,j}$ is a component sample value at position (i,j) in the block;
   obtaining an overlapped block motion compensation, OBMC, restriction criterion, wherein the OBMC restriction criterion comprises a block spatial activity threshold;
   determining whether the OBMC restriction criterion is met with respect to the block, wherein determining whether the OBMC restriction criterion is met comprises determining whether the spatial activity of the block is below the block spatial activity threshold; and
   in response to determining that the OBMC restriction criterion is met, decoding the block without performing full OBMC decoding on the block, wherein decoding the block without performing full OBMC decoding on the block comprises decoding the block without performing OBMC decoding on the block.

2. The method of claim 1, further comprising calculating an average spatial activity of the block according to the formula:

$$La = (\Sigma_{i \in M, j \in N} \Delta P_{i,j})/M \times N \quad [2]$$

where M and N are dimensions of the block, and wherein determining whether the OBMC restriction criterion is met comprises determining whether the average spatial activity of the block is below the block spatial activity threshold.

3. The method of claim 1, wherein the block spatial activity threshold is based on a decoding bit depth and dimensions M and N of the block.

4. The method of claim 3, wherein the block spatial activity threshold is calculated according to the formula:

$$\text{threshold} = M*N*(4 << (\text{bit\_depth}-8)).$$

5. The method of claim 1, further comprising:
   estimating a spatial activity of a neighboring block that is adjacent the block; and
   determining whether to use motion vectors associated with the neighboring block in OBMC decoding of the block based on the spatial activity of the neighboring block.

6. The method of claim 5, wherein determining whether to use motion vectors associated with the neighboring block in OBMC decoding of the block based on the spatial activity of the neighboring block comprises determining whether the spatial activity of the neighboring block is below a second threshold; and
   in response to determining that the spatial activity of the neighboring block is below the second threshold, performing OBMC decoding on the block without reference to motion vectors of the neighboring block.

7. The method of claim 1, further comprising:
   comparing a local illumination compensation (LIC) flag of the block to an LIC flag of a neighboring block that is adjacent the block; and
   determining whether to use motion vectors associated with the neighboring block in OBMC decoding of the block based on the comparison of the LIC flag of the block and the LIC flag of the neighboring block.

8. The method of claim 7, further comprising:
   determining to use motion vectors associated with the neighboring block in OBMC decoding of the block based in response to determining that the LIC flags of the block and the neighboring block are the same, or
   determining not to use motion vectors associated with the neighboring block in OBMC decoding of the block based in response to determining that the LIC flags of the block and the neighboring block are different.

9. The method of claim 8, further comprising:
   determining LIC weight, W, and offset, O, parameters for the selected block and the neighboring block;
   generating weight difference, $\Delta W$, between the LIC weight of the selected block and the LIC weight of the neighboring block;
   generating an offset difference, $\Delta O$, between the LIC offset of the selected block and the LIC offset of the neighboring block; and
   skipping OBMC if the weight difference $\Delta W$ exceeds a first threshold and/or the offset difference $\Delta O$ exceeds a second threshold.

10. A decoder adapted to perform the method of claim 1.

11. A method of encoding a picture of a video signal, comprising:
    selecting a block of the picture for encoding;
    estimating a spatial activity of the block, wherein estimating the spatial activity of the block comprises calculating a spatial activity of at least one sample of the block according to the formula:

$$\Delta P_{i,j} = |4*P_{i,j} - P_{i-1,j} - P_{i+1,j} - P_{i,j-1} - P_{i,j+1}|,$$

where $P_{i,j}$ is a component sample value at position (i,j) in the block;
    obtaining an overlapped block motion compensation, OBMC, restriction criterion, wherein the OBMC restriction criterion comprises a block spatial activity threshold;

determining whether the OBMC restriction criterion is met with respect to the block, wherein determining whether the OBMC restriction criterion is met comprises determining whether the spatial activity of the block is below the block spatial activity threshold; and in response to determining that the OBMC restriction criterion is met, encoding the block without performing full OBMC encoding on the block, wherein encoding the block without performing full OBMC encoding on the block comprises encoding the block without performing OBMC encoding on the block.

12. The method of claim 11, further comprising calculating an average spatial activity of the block according to the formula:

$$La=(\Sigma_{i\in M, j\in N}\Delta P_{i,j})/M\times N,$$

where M and N are dimensions of the block, and wherein determining whether the OBMC restriction criterion is met comprises determining whether the average spatial activity of the block is below the block spatial activity threshold.

13. The method of claim 11, wherein the block spatial activity threshold is based on an encoding bit depth and dimensions M and N of the block, wherein the block spatial activity threshold is calculated according to the formula:

$$\text{threshold}=M*N*(4<<(\text{bit\_depth}-8)).$$

14. The method of claim 11, further comprising:
estimating a spatial activity of a neighboring block that is adjacent the block; and
determining whether to use motion vectors associated with the neighboring block in OBMC encoding of the block based on the spatial activity of the neighboring block.

15. An encoder adapted to perform the method of claim 11.

* * * * *